UNITED STATES PATENT OFFICE.

THOMAS TWYNAM, OF MINFORD GARDENS, COUNTY OF MIDDLESEX, ENGLAND.

REFRACTORY LINING FOR METALLURGICAL FURNACES.

SPECIFICATION forming part of Letters Patent No. 371,233, dated October 11, 1887.

Application filed July 27, 1886. Serial No. 209,250. (No model.)

*To all whom it may concern:*

Be it known that I, THOMAS TWYNAM, a subject of Her Majesty the Queen of Great Britain, residing at Minford Gardens, West Kensington Park, in the county of Middlesex, England, have invented certain new and useful Improvements in Refractory Linings for Metallurgical Furnaces; and I do hereby declare that the following is a full, clear, and exact description of the invention, which will enable others skilled in the art to which it appertains to make and use the same.

The object of my invention is to produce by the use of chrome-iron ore a highly-refractory lining for metallurgical furnaces, converter bottoms and plugs, and molds for steel and other castings; also, for furnaces for the smelting reduction or fusion of metals, more especially lead, copper, zinc, nickel, aluminum, and silver, and for furnaces for melting glass.

I may here say I am aware that prior to my invention chrome ore had been mixed with a small percentage of aluminous or other earth, alumina, or silicate of alumina as a binding material. This forms no part of my invention.

It is found that when chrome-iron ore ground up with water is used for furnace-linings and the like it very readily crumbles away, and the same thing happens when tar or oil or carbonaceous matter is mixed as a "bind" with the ground chrome ore, the ore readily crumbling away as soon as the carbon has been burned out by the action of the heat. To remedy this defect I mix with the finely-ground, but not too silicious, chrome ore about five per cent. of its weight of the chromate or bichromate of soda or potash or of the chromate or bichromate of an alkaline earth, such as the chromate or bichromate of lime or magnesia. In place of using chromate or bichromate direct, I sometimes, to obtain the same result, mix about two per cent. of an alkaline carbonate with the ore, or even an alkaline silicate may be used; but not more than five per cent. of this should be added.

I always prefer to first dissolve the alkaline earth or salt to be used in just sufficient water as is required to moisten the ground chrome ore and make it cohere. Mix the solution well up with the ore, and then use it direct for the manufacture of refractory bricks or blocks for furnace-linings, or for the manufacture of plugs or bottoms for use in Bessemer converters, the bricks or plugs being fired at about the ordinary heat before being used in the furnace or vessel; or I form the lining of the plastic mass *in situ*, ramming it round suitable molds placed in the furnace or converter. In this case lumps of unground ore may be mixed in it. I also employ the mixture as a material for lining the molds used in the manufacture of steel or other castings.

By my invention the use of ground chrome ore for the purposes stated is rendered practically available, the linings and bricks produced thereby not being liable to fall to powder or crumble easily away, as has hitherto been the case when chrome ore has been mixed with water or tar or other carbonaceous matter.

While it has heretofore been customary to fuse chrome ore with an alkaline salt in excess in the manufacture of chromates, this in nowise comprises my invention; for, in accordance with my invention, I bind together chrome ore with a view to its utilization in metallurgical apparatus by mixing therewith either an alkali or alkaline earth, chromate or bichromate, or such an alkaline salt which will, when dissolved in water and intimately mixed with the ground ore, form with the chrome ore a small quantity of chromate, which binds together the unacted-upon chrome ore.

I do not broadly claim the use of chrome ore, ground or otherwise, as a lining for metallurgical furnaces; but

What I claim, and desire to secure by Letters Patent, is—

1. The within-described refractory lining for metallurgical furnaces and like purposes, composed of comminuted chrome ore and an alkali or alkaline earth, chromate or bichromate, or an alkaline salt which tends to form a chromate, mixed, shaped, and then fired, substantially as described.

2. The improved refractory lining for metallurgical furnaces or molds, consisting of chrome ore mixed with a small percentage of an alkali or alkaline earth chromate, or described equivalents, substantially as and for the purpose set forth.

In witness whereof I have hereunto set my hand in the presence of two subscribing witnesses.

THOMAS TWYNAM.

Witnesses:
PHILIP M. JUSTICE,
ALLEN P. JONES.